Nov. 23, 1926.

F. REDICK 1,608,427

PIPE LAYING ATTACHMENT

Filed June 6, 1925

Frank Redick
INVENTOR

BY Victor J. Evans
ATTORNEY

WITNESS:

Nov. 23, 1926.  
F. REDICK  
1,608,427  
PIPE LAYING ATTACHMENT  
Filed June 6, 1925    4 Sheets-Sheet 2
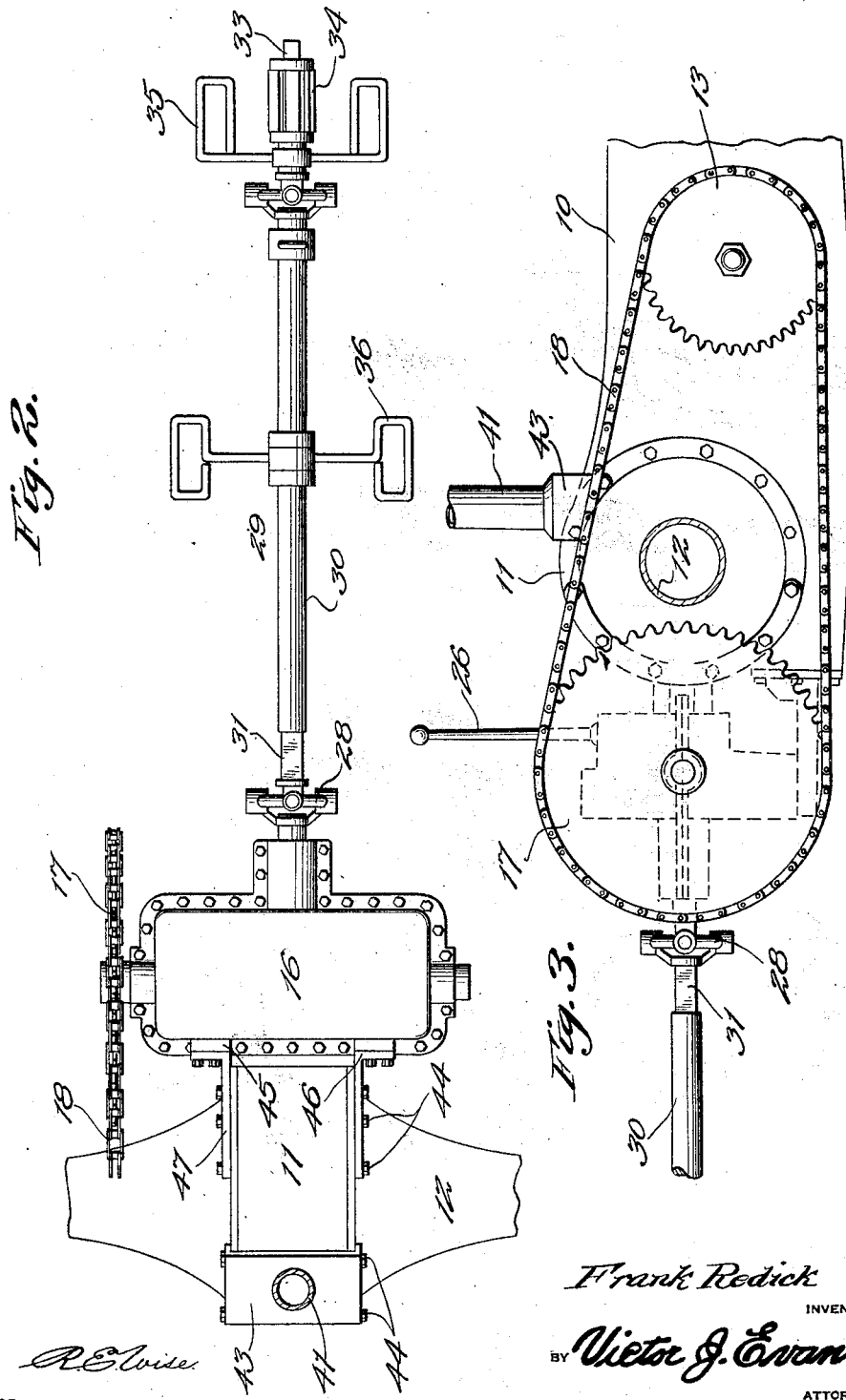

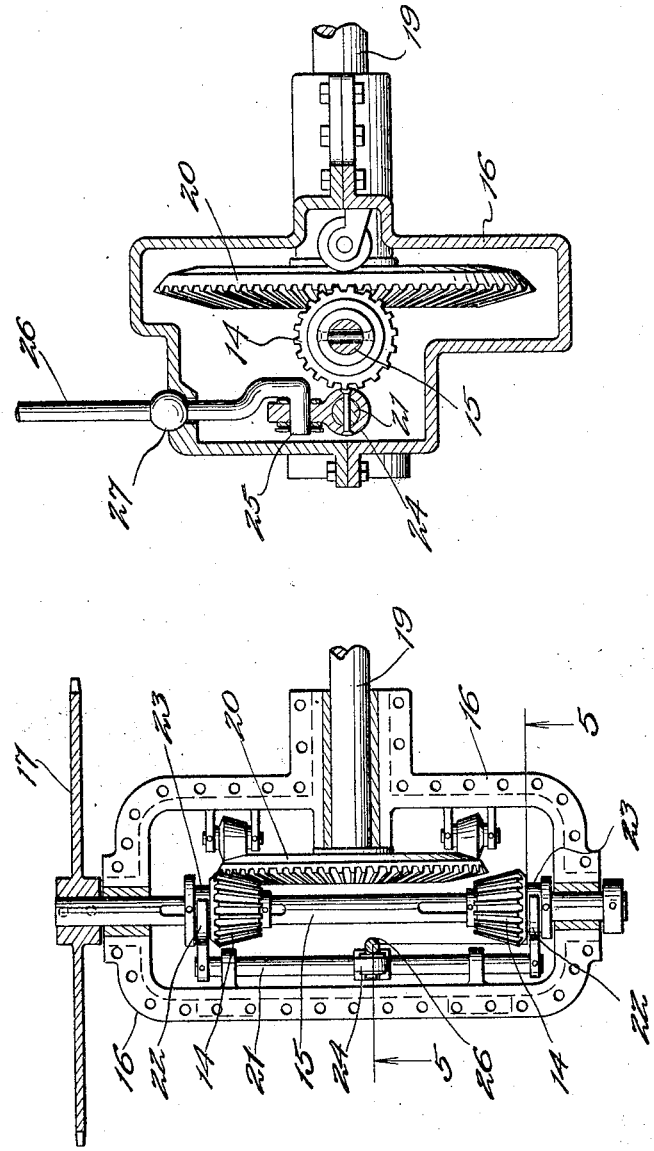

Nov. 23, 1926.
1,608,427
F. REDICK
PIPE LAYING ATTACHMENT
Filed June 6, 1925     4 Sheets-Sheet 4
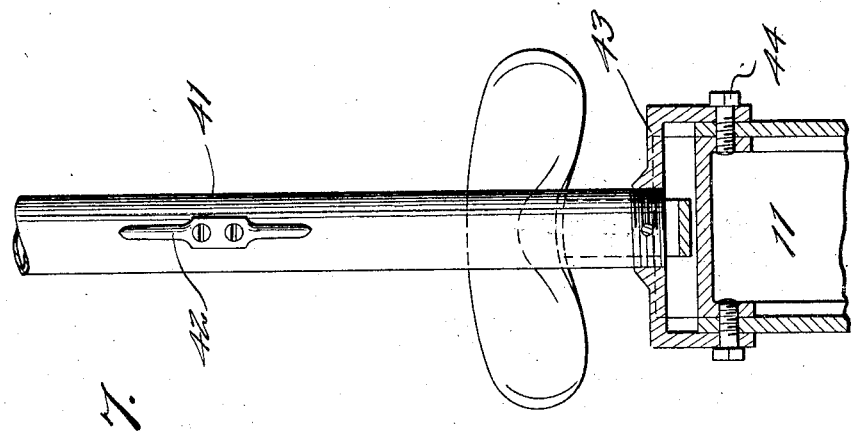
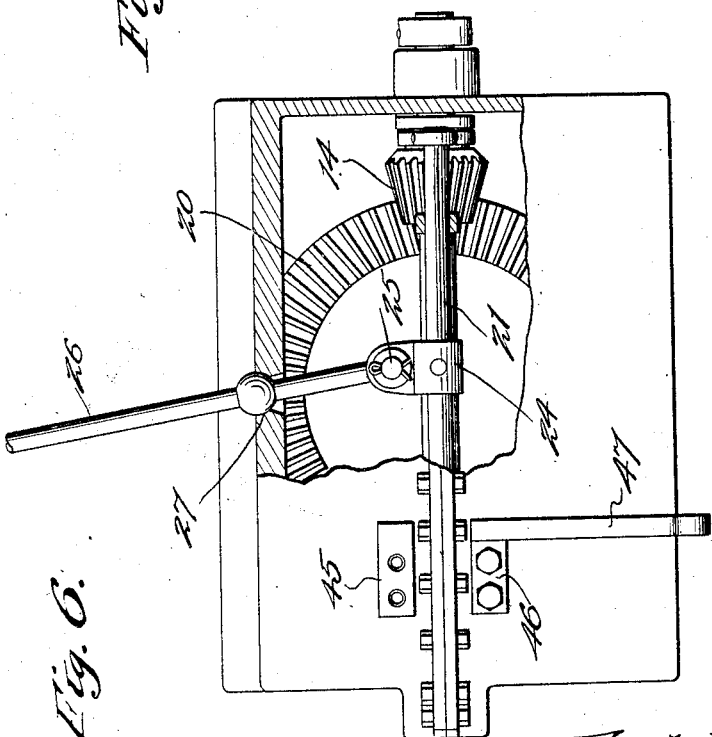
INVENTOR
Frank Redick
BY Victor J. Evans
ATTORNEY
VITNESS:

Patented Nov. 23, 1926.

1,608,427

UNITED STATES PATENT OFFICE.

FRANK REDICK, OF PARKERTON, WYOMING.

PIPE-LAYING ATTACHMENT.

Application filed June 6, 1925. Serial No. 35,494.

This invention relates to means for laying pipe lines and has for an object the provision of means which may be attached to a tractor and the power of the latter utilized for rotating pipe sections to connect and disconnect said sections and thus provide a relatively simple and efficient power operated machine by means of which pipe lines may be laid or taken up at a minimum cost.

With the above and other objects in view, the invention further includes the following novel features and details of construction, to be hereinafter more fully described, illustrated in the accompanying drawings and pointed out in the appended claims.

In the drawings:—

Figure 2 is a top plan view of the same.

Figure 3 is a fragmentary elevation looking at the side opposite that shown in Figure 1.

Figure 4 is a detail plan view showing the transmission mechanism of the invention with the cover of the housing removed.

Figure 5 is a section taken substantially on the line 5—5 of Figure 4 with the cover in place.

Figure 6 is a rear elevation of the transmission mechanism detached from the tractor with a portion of the housing broken away.

Figure 7 is a fragmentary sectional view illustrating the manner of mounting the mast.

Referring to the drawings in detail wherein like characters of reference denote corresponding parts, the invention is shown as applied to a tractor of the Fordson type, but may with slight modifications, be attached to other types of tractors.

Figure 1:
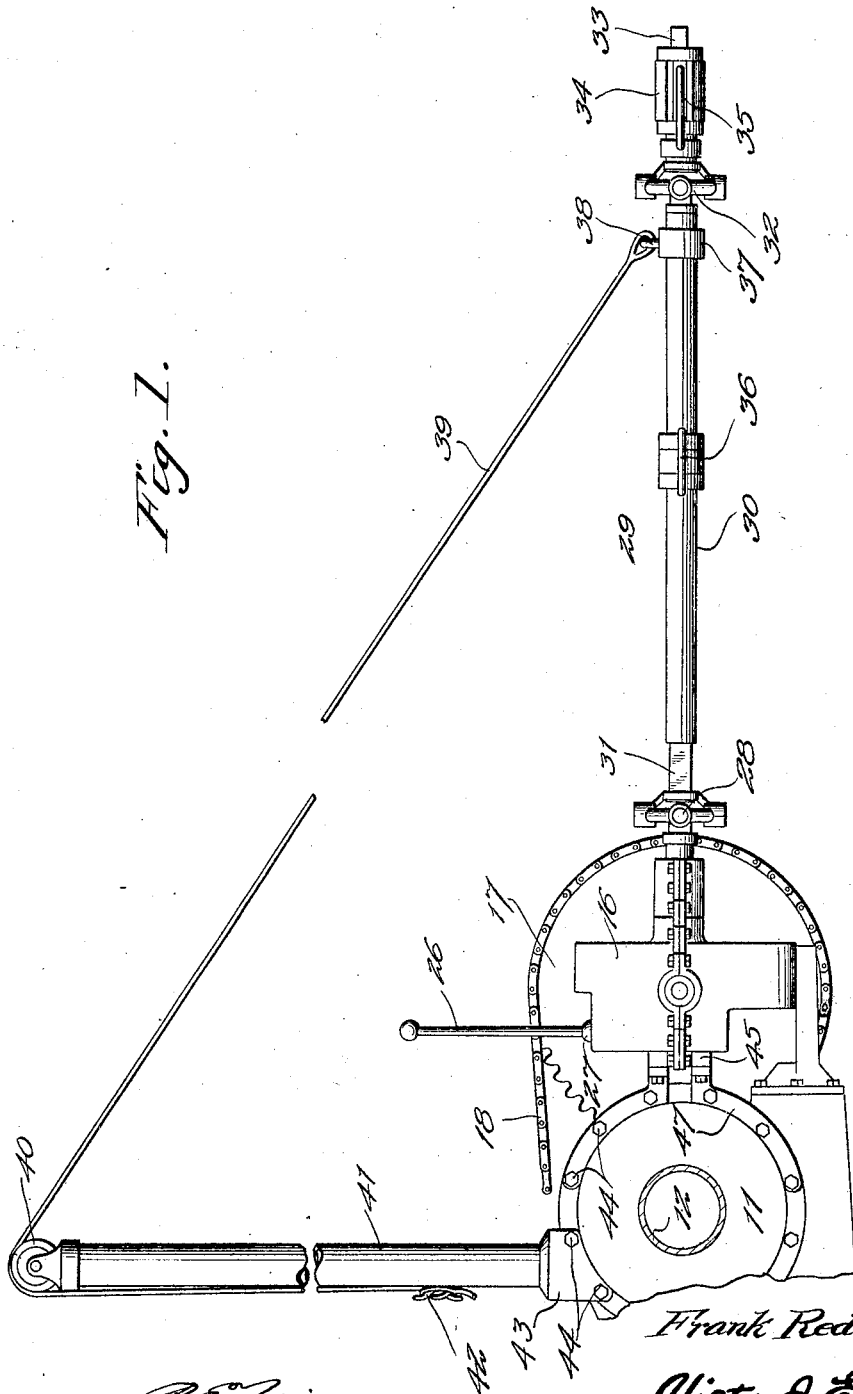
Figure 1 is a side elevation showing a fragmentary portion of a tractor with the invention applied.

In the tractor shown, the reference character 10 designates a portion of the frame or casing, 11 the transmission housing of the tractor and 12 a portion of the rear axle housing, while 13 designates a sprocket which is mounted at one side of the tractor for the purpose of utilizing the power of the tractor engine for the operation of various machines or devices.

The invention comprises a transmission mechanism which is shown in Figures 4, 5 and 6 of the drawings and which comprises beveled pinions 14 splined upon a shaft 15. This shaft is mounted in bearings provided in a housing 16 and one of these shafts extends through the housing and has secured thereon a sprocket 17. A sprocket chain 18 engages about the sprocket 17, and in turn passes over the sprocket 13 shown in Figure 3, which sprocket may be connected in any suitable manner (not shown) with a driving member (not shown) of the tractor engine, for the purpose of transmitting motion to the shaft 15. The housing 16 also provides a bearing for a short shaft section 19 which extends into the housing and which has secured thereon a beveled gear 20, the latter being adapted to be engaged and driven by either one of the pinions 14.

Slidingly mounted in suitable bearings provided in the housing 16 is a shaft 21 to the opposite ends of which are secured yokes 22 and these yokes engage grooved collars 23 provided upon the hubs of the pinions 14. Secured upon the shaft 21 is a clamp 24 to which is pivotally secured as shown at 25, the inner end of a gear shift lever 26, the latter having a universal pivotal bearing in the housing 16 as shown at 27. By shifting the lever 26 in one direction, the shaft 21 may be moved axially to engage one of the pinions 14 with the gear 20 and rotate the shaft in one direction, while a reverse movement of the gear shift lever 26 will disengage this pinion and engage the other pinion, so that the shaft 19 may be driven in an opposite direction.

The shaft section 19 has a universal connection 28 with a shaft 29, the latter including a hollow section 30 which is provided with a transversely rectangular bore and a transversely rectangular section 31 which is slidingly received in the section 30 so as to provide a telescopic connection between the sections to regulate the length of the shaft. The outer end of the shaft 29 has a universal connection 32 with a short shaft section 33 and the latter has mounted thereon a reversible pipe gripping member 34 which is adapted to engage a pipe section.

Extending from the opposite sides of the pipe gripping member 34 are handles 35 for operating the gripper, while handles 36 swiveled to the section 30 of the shaft 29 serve to provide means for handling this shaft.

Secured to the outer end of the shaft 29 is a collar 37 which carries an eye 38 and secured to this eye is one end of a cable 39. This cable passes over a grooved pulley or sheave 40 which is mounted at the upper end of a mast 41 and its ends may be secured to the mast by any suitable means, such as is shown at 42. By means of the cable 39, the height of the outer end of the shaft 29 may be controlled.

The mast 41 is detachably secured to the tractor and for this purpose its lower end is secured to an inverted substantially U-shaped base 43 whose opposite ends are provided with openings which register with the usual openings for the bolts of the transmission housing 11 of the tractor. These bolts are indicated at 44 and serve both as a means for securing the rear axle housing 12 to the transmission housing and for securing the mast in place.

The transmission housing 16 which carries the driving mechanism for the shaft 29 is also detachably secured by the bolts 44 which serve to secure the rear axle housing 12 to the transmission housing 11. To provide for this, the housing 16 is provided with spaced bosses 45 to which are bolted arms 46, the latter forming a part of curved bracket arm 47. A pair of these arms 47 is provided upon each side of the transmission housing 11, the arms of each pair extending in opposite directions as shown in Figure 1 of the drawings and having openings therein for the passage of the bolts 44.

It will be apparent from the foregoing description and accompanying drawings that the invention provides a pipe laying mechanism which may be readily attached to or removed from a tractor and which may be operated by the power plant of the tractor in such manner as to engage and grip a pipe section for the purpose of attaching said pipe section to or removing the same from another pipe section, so that the laying or removing of a pipe line may be greatly facilitated.

The invention is susceptible of various changes in its form, proportions and minor details of construction and the right is herein reserved to make such changes as properly fall within the scope of the appended claims.

Having described the invention what is claimed is:—

1. A pipe laying attachment for tractors comprising a transmission mechanism, means to detachably support said mechanism upon the tractor, means operatively associating said mechanism with the tractor driving mechanism, whereby said transmission mechanism may be operated, a shaft driven by said transmission mechanism, means at the outer end of the shaft for removable engagement with a pipe section to rotate the latter when the shaft is rotated, universal joints interposed between the shaft and said transmission mechanism and the shaft and the pipe engaging means, and means included in said transmission mechanism to control the direction of rotation of the shaft.

2. A pipe laying attachment for tractors comprising a housing, means to removably secure the housing to a tractor, a short shaft mounted in a bearing carried by the housing, a shaft having one end connected to the outer end of the short shaft by a universal joint, transmission gearing located within the housing and connected to the inner end of the short shaft, means operatively associating the transmission mechanism and the tractor driving mechanism to rotate the shaft, means to control its direction of rotation, adjustable means to control the position of the outer end of the shaft, and pipe engaging means at the outer end of said shaft.

3. A pipe laying attachment for tractors comprising a housing, pairs of spaced oppositely disposed curved brackets secured to the housing for removable attachment upon opposite sides of the transmission housing of the tractor, a short shaft mounted in a bearing carried by the housing, a shaft having one end connected to the outer end of the short shaft by a universal joint, transmission gearing located within the housing and connected to the inner end of the short shaft, means operatively associating the transmission mechanism and the tractor driving mechanism to rotate the shaft, means to control its direction of rotation, adjustable means to control the position of the outer end of the shaft, and pipe engaging means at the outer end of said shaft.

4. A pipe laying attachment for tractors comprising a housing, means to removably secure the housing to a tractor, a short shaft mounted in a bearing carried by the housing, a shaft having one end connected to the outer end of the short shaft by a universal joint, transmission gearing located within the housing and connected to the inner end of the short shaft, means operatively associating the transmission mechanism and the tractor driving mechanism to rotate the shaft, means to control its direction of rotation, means including a mast removably attached to the transmission housing of the tractor to control the position of the outer end of the shaft, and pipe engaging means at the outer end of said shaft.

5. In a pipe laying apparatus, the combination with a differential housing of a tractor, of a transmission mechanism including a casing operatively supported on the rear of the differential housing, said transmission mechanism comprising a shaft extending axially concentric with the transmission casing and provided with a beveled spur gear on the interior of the transmission casing, a shaft having a pipe gripping device at its rear end and having its forward end operatively connecting with said transmission shaft, a transverse shaft mounted transversely of the transmission casing and having beveled pinions shiftable on the transverse shaft and of which either one may engage with the beveled spur gear, a shifting shaft operatively mounted in guides in the transmission casing and having means at its opposite ends operatively connecting with said pinions, means operatively connecting with the shiftable shaft for shifting the same and connecting one or the other of the pinions with the beveled spur gear, the end of the shaft carrying the gripping device having a cable, a standard rising from the differential housing and provided with a pulley at its upper end over which the cable passes whereby the cable may be used for raising or lowering the gripping device carrying the shaft, to connect and disconnect a pipe main in the laying of the same, and means for attaching the end of the cable to the standard to hold the gripping device carrying the shaft in position.

In testimony whereof I affix my signature.

FRANK REDICK.